US006929159B1

(12) United States Patent  
Haig (10) Patent No.: US 6,929,159 B1  
(45) Date of Patent: Aug. 16, 2005

(54) QUANTITATIVE MEASURING DISPENSER

(76) Inventor: Voy Haig, 115 Mountainview Rd., Greeley, PA (US) 18425

( * ) Notice: Subject to any disclaimer, the term of this patent is extended or adjusted under 35 U.S.C. 154(b) by 0 days.

(21) Appl. No.: 10/996,544

(22) Filed: Nov. 24, 2004

(51) Int. Cl.[7] ............................................. G01F 11/26
(52) U.S. Cl. .................. 222/456; 222/548; 141/18
(58) Field of Search ............................. 222/456, 548; 141/18

(56) References Cited

U.S. PATENT DOCUMENTS

| | | | |
|---|---|---|---|
| 2,243,452 A | 5/1941 | Bickel et al. ................. | 221/98 |
| 2,853,213 A | 9/1958 | Buehlig ....................... | 222/455 |
| 2,899,115 A | 8/1959 | Matter ........................ | 222/455 |
| 3,687,341 A | 8/1972 | Stanley et al. .............. | 222/455 |
| 4,144,989 A | 3/1979 | Joy ............................. | 222/438 |
| 4,346,823 A * | 8/1982 | Eppenbach .................. | 222/456 |
| 4,832,235 A * | 5/1989 | Palmer ........................ | 222/548 |
| 5,243,970 A | 9/1993 | Ambrosio et al. .......... | 128/203.15 |
| 5,588,563 A | 12/1996 | Liu ............................. | 222/158 |
| 6,176,238 B1 | 1/2001 | McDerment ................ | 128/203.15 |

* cited by examiner

Primary Examiner—Philippe Derakshani  
(74) Attorney, Agent, or Firm—Sandra M. Kotin (57) ABSTRACT

A quantitative measuring dispenser is provided for attachment to a container of a freely flowing material. The dispenser is composed of three segments. The first segment consists of a disc with a shaft attached to the center of the bottom surface. There are two opposing openings through the disc. The second segment is in the form of a barrel with a central bore and two opposing axial chambers. The third segment is cylindrical with a cover having two opposing openings. The shaft is passed through the central bore of the barrel and attached to the top surface of the third segment so the first and third segments function as a single unit. The openings in the disc and the openings in the third segment must be at right angles to each other when the connection is made to properly sequence the dispenser. The barrel is rotatable with respect to the unit. The dispenser is attached to the bottle holding the freely flowing material by means of threaded inner walls of the third segment that cooperate with the threading on the neck of the bottle. The bottle and attached dispenser are inverted so that the freely flowing material can enter the chambers. To fill the chambers the barrel is rotated so that the openings in the third segment communicate with the tops of the chambers. At the same time the lower ends of the chambers are closed by the disc. To dispense the material the barrel is rotated until the tops of the chambers are closed by the third segment and the bottoms of the chambers communicate with the openings in the disc. Other designs may utilize one or more chambers with the openings sequenced accordingly. A measuring cup with openings in one wall to hold and dispense specific quantities of water can be utilized with the dispenser when the material must be taken with water. The cup can be superimposed on the dispenser for storage.

26 Claims, 11 Drawing Sheets

QUANTITATIVE MEASURING DISPENSER

FIELD OF THE INVENTION

The instant invention relates to a device and method for dispensing a metered quantity of a freely flowing solid or liquid material.

BACKGROUND OF THE INVENTION

Medicaments are prescribed in specific quantities or doses. For a medicament that is not in the form of a tablet or capsule the patient must be responsible for metering the dose. When the medicament is a liquid the specific dose is not as difficult to measure since the dosing is usually by means of a dropper, teaspoon or the use of dosing markings on a bottle cap. Such amounts are not quantitatively reproducible but may be accepted as marginally satisfactory. Syringe dispensers provide more acceptable results, but are only practical for small quantities, i.e., less than twenty milliliters. These methods of measurement are not easily accommodated for solids such as powders and granular materials. Powders may be light and can escape during transfer while granular materials often flow too freely and spill over the rim of the measuring container. If the materials are tamped or compressed into a teaspoon or bottle cap the quantity may easily be altered and leveling the top causes losses. Filling a cap up to a specific mark does not provide an acceptable means of dispensing either a liquid or a solid when the specific dose is essential.

Few devices have been developed to dispense metered quantities of powders. In U.S. Pat. No. 5,243,970 Ambrosio et al. teaches a device to administer metered amounts of powdered medicaments. The device is complex and moves a powder from a reservoir to a metering plate having a series of openings or perforated areas. A blade assembly scrapes the powder into the perforated areas. Spring loaded means rotate the plate. The medicament is administered by inhalation through a conduit. The dose is the quantity of powder that is scraped into one set of perforated areas. The doses dispensed from this device are extremely small. McDerment, in U.S. Pat. No. 6,176,238 teaches a dispenser for substances in powder or granular form. The dose of powder is moved from a reservoir vertically downward to a disc having a metering hole. The powder is then inhaled by mouth through a mouthpiece affixed at the bottom of the device. The device must be vertical when the powder enters the metering hole. To insure that the device is properly held, a mechanism is provided insuring that no powder is dispensed unless the device is in a vertical orientation. The dose dispensed by this device is also very small being only that quantity that is contained in the metering hole.

Devices have been developed to dispense measured quantities of solids such as coffee, sugar, salt, powdered milk or soap powder. These devices are affixed to the container holding the particular solid. When the container is a jar the dispensing device can replace the screw cap on the jar. If the container is a box, the device is usually attached to the box adjacent to a pouring opening on the side or top of the box. Partitions within the devices create two areas, one as a filling area and the other as a dispensing area. The container with the device attached is inverted a first time to permit the powder to enter the filling area, a second time to permit the powder to enter the dispensing area, and a third time to allow the powder to flow out of the device through a discharge opening. The filling area is usually refilled during last step so that once the first dispensing has been completed there is always powder in the filling area. These devices can dispense measured quantities of powder, but even with a dispensing area of a specific volume, the third inversion cannot prevent material in the filling area from spilling over the partition into the dispensing area. These devices are inexact and as noted are not meant for medicaments. (U.S. Pat. No. 2,243,452 to Bickel et al.; U.S. Pat. No. 2,853,213 to Buehlig; U.S. Pat. No. 2,899,115 to Matter; and U.S. Pat. No. 3,687,341 to Stanley et al.) Joy, in U.S. Pat. No. 4,144,989 adds an adjustable baffle to a similar arrangement of partitions as noted above. The adjustable baffle varies the size of the measuring area, but does not produce exact quantities and has questionable reproducibility. The quantities of powder dispensed through these devices are, for the most part, considerably greater than would be desired for a medicament so that acceptable tolerances can be considerably larger.

Another form of measuring dispenser is designed for dispensing powdered milk and is taught by Liu in U.S. Pat. No. 5,588,563. A cylinder containing the powder is fitted with a metering cap. The cap has a transparent or translucent cover marked off in metered lines. A plate separates the container from the interior of the cap and has an opening to permit the powder to flow from the container into the cap when the cylinder is inverted. A rotatable divider enables changing the quantity of powder dispensed by noting the position of the divider through the transparent cover. The cap is filled with the desired quantity of powder and an outlet in the cover is opened so the powder can be poured out. This device could not dispense exact quantities determined to minimal tolerances.

None of the aforementioned powder dispensing devices can dispense reproducible quantitative amounts of material nor do they provide any form of seal between the container of material and the dispenser when material is being stored with the measuring device attached to the container. None of these devices provide for sealing means to exclude moisture from the dispenser or container.

There is a need for a device to dispense quantitatively measured doses of a powdered or granular medicament as well as a liquid with minimal tolerances. There is a need for such a device that can easily be used by the young, the elderly and persons with limited dexterity and visual impairments as well as by the able-bodied. There is also a need for a device that does not become clogged, does not admit moisture, and provides a seal to close off the reservoir from the dispensing chamber so material does not move from the reservoir into the dispensing chamber when the dose is dispensed. There is a need for a dispensing device that has sealing means to separate the reservoir from the atmosphere so that it does not have to be separated from the reservoir when the dispenser is not in use.

BRIEF SUMMARY OF THE INVENTION

The instant invention provides a device for dispensing medicaments and other materials directly from the original container. The device is attached to the container and meters the dose exactly with minimal tolerances and with no chance for a partial dose or dose larger than required. The device of the instant invention is easy to affix to the container and easy to use. When not needed the container is sealed from the atmosphere, from both air and moisture.

It is an object of the instant invention to provide a dispenser for medicaments and other materials that is easy to affix to the container and is easy use by persons of all ages and physical abilities.

Another object of the instant invention is to provide a dispenser that is inexpensive and easy to manufacture.

A further object of the instant invention is to have a dispenser that will not clog and will smoothly load and dispense the material with no spillage or waste.

A still further object of the instant invention is to provide a dispenser that can be used for long periods of time with little distortion or damage and that will continuously deliver a metered dose of the material.

Another object of the instant invention is to provide a dispenser that can continuously dispense metered quantities of solid material without material build-up or friction damage between parts.

A further object of the instant invention is to provide a quantitative dispenser for which the user can see when the volumetric chamber is filled and when it is emptied.

An object of the instant invention is to provide a design that works well for solids and liquids and for small quantities and larger quantities with the same precision.

Another object of the instant invention is to provide an accurate means to measure and dispense liquids and solids for persons with visual limitations including total blindness.

The invention is a dispenser for containing and dispensing a measured quantity of a freely flowing material. The dispenser comprises a first segment having a disc with an upper surface and a lower surface, a shaft having a first end which is fixedly attached at the center of the lower surface of the disc and a second end, and two apertures opposingly disposed in the disc. A second segment is substantially in the form of a barrel and having an upper surface, a lower surface, a central bore and two axial chambers situated on either side of the bore and extending through the barrel. A third segment having a cylindrical wall with an inner surface and an outer surface, a cover member integral with the upper edge of the wall and having an upper surface and a lower surface and two apertures opposingly disposed in the cover member, and means to permanently affix the second end of the shaft to the center of the upper surface of the cover member. When the second end of the shaft is passed through the central bore and the disc is rotated until an imaginary line through the apertures in the disc is at 90° to an imaginary line through the apertures in the cover member and the second end of the shaft is permanently affixed to the upper surface of the cover member, the lower surface of the disc is substantially contiguous with the upper surface of the barrel and the lower surface of the barrel is substantially contiguous with the upper surface of the cover member, the first segment and the third segment can function as a single unit, and when the barrel is rotated with respect to the unit so that the apertures in the cover member communicate with the bottoms of the chambers and the disc closes the tops of the chambers the dispenser can be filled with the freely flowing material and when the barrel is rotated with respect to the unit so that the apertures in the disc communicate with the tops of the chambers and the cover member closes the bottoms of the chambers the dispenser can dispense the freely flowing material.

A dispenser for containing and dispensing measured quantities of a freely flowing material, said dispenser comprises a first segment substantially in the form of a disc with an upper surface, a lower surface, and at least one aperture therethrough. There is a second segment substantially in the form of a barrel and having an upper surface, a lower surface, and at least one chamber extending through the barrel. A third segment having a cylindrical wall with an inner surface and an outer surface, a cover member integral with the upper edge of the wall and having an upper surface and a lower surface and at least one aperture disposed in the cover member. The device includes means to permanently attach the first segment to the third segment such that the two segments function as a single unit and the at least one aperture in the disc is not aligned with the at least one aperture in the cover member. The unit is rotatable with respect to the barrel. When the first segment is attached to the third segment, the lower surface of the disc is substantially contiguous with the upper surface of the barrel and the lower surface of the barrel is substantially contiguous with the upper surface of the cover member, and when the barrel is rotated with respect to the unit so that the at least one aperture in the cover member communicates with the bottom of the at least one chamber and the disc completely closes the top of the at least one chamber the dispenser can be filled with the freely flowing material and when the barrel is rotated so that the at least one aperture in the disc communicates with the top of the at least one chamber and the cover member completely closes the bottom of the at least one chamber the dispenser can dispense the freely flowing material.

A dispenser for containing and dispensing measured quantities of a freely flowing material is in combination with a container for containing and dispensing measured quantities of a liquid. The dispenser comprises a first segment substantially in the form of a disc with an upper surface, a lower surface, and at least one aperture therethrough, a second segment substantially in the form of a barrel and having an upper surface, a lower surface, and at least one chamber extending through the barrel, a third segment having a cylindrical wall with an inner surface and an outer surface, a cover member integral with the upper edge of the wall and having an upper surface and a lower surface and at least one aperture disposed in the cover member and means to permanently attach the first segment to the third segment so that the two segments function as a single unit and the at least one aperture in the disc is not aligned with the at least one aperture in the cover member, said unit being rotatable with respect to the barrel. The container comprises a cylinder having a base and being open at the top with at least one opening in the wall of the cylinder at a substantial distance from the base so that the cylinder can contain a measured quantity of a liquid when filled to the level of the at least one opening. The container is superimposable on the dispenser for storage.

A container for holding and dispensing a measured quantity of a liquid comprises a cylinder having a base and being open at the top and at least one opening in the wall of the cylinder at a predetermined calibrated distance from the base so that the cylinder can hold the measured quantity of the liquid when filled to the level of the opening. The container can be filled so that it holds and can dispense the measured quantity of liquid by pouring the liquid into the container until the liquid reaches the opening through which excess liquid flows leaving the measured quantity of liquid in the container to be thereafter dispensed.

A container for holding and dispensing measured quantities of a liquid comprises a cylinder having a base and being open at the top, a first opening in the wall of the cylinder at a predetermined calibrated distance from the base so that the cylinder can hold a first measured quantity of the liquid when filled to the level of the first opening, and at least one second opening in the wall of the cylinder directly above the first opening at least one second predetermined calibrated distance from the base so that the cylinder can hold at least one second measured quantity of the liquid when filled to the level of the at least one second opening. The container can be filled so that it holds and can dispense the first measured quantity of liquid by pouring the liquid into the container until the liquid reaches the first opening through which excess liquid flows leaving the first measured quantity of liquid in the container to be thereafter dispensed, or the first opening can be closed by placing a finger over it and the container filled until the liquid reaches and flows out of the at least one second opening leaving the at least one second measured quantity of liquid in the container to be thereafter dispensed.

Other features and advantages of the invention will be seen from the following description and drawings.

DETAILED DESCRIPTION OF THE INVENTION

Figure 1:
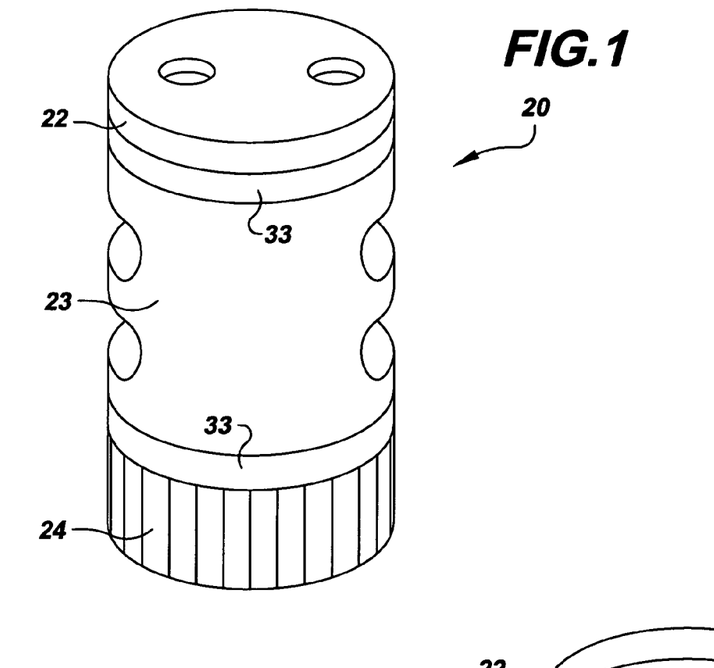
FIG. 1 is a top perspective view of the dispenser of the instant invention.
Figure 2:
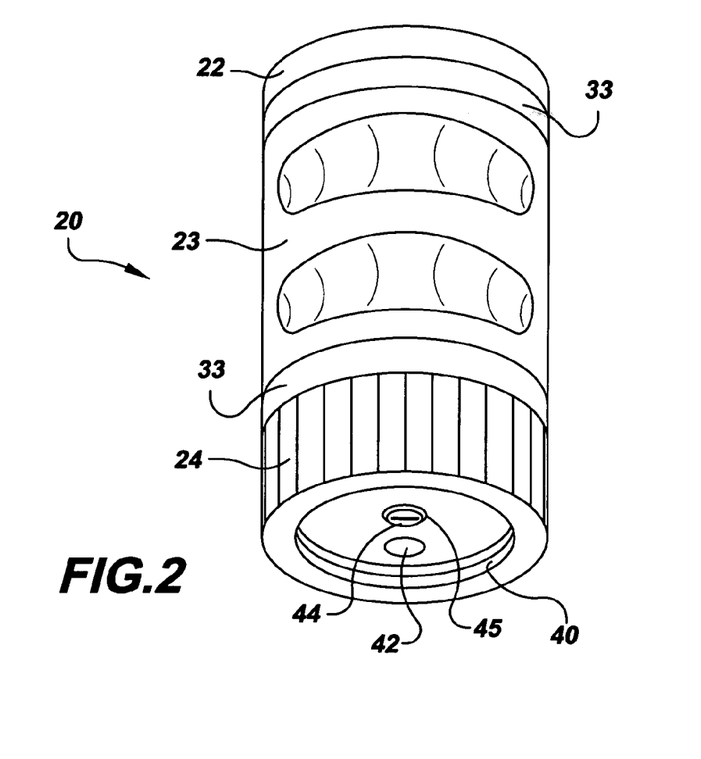
FIG. 2 is a bottom perspective view of the dispenser.

The quantitative measuring dispenser 20 of the instant invention may admit and contain a measured quantity of a liquid or solid material and then dispense the measured quantity. The dispenser 20 as seen in FIGS. 1 and 2 may be composed of three major parts, a delivery segment 22, a barrel 23 and a connector 24, this order being illustrated, though in use, the dispenser may be inverted and the segments presented in the reverse order. The three segments work together to admit, contain, and dispense the measured quantity of material which may also be referred to as the dose. The design of the dispenser 20 may be compatible for both solids and liquids. Minor variations may provide better efficiency depending on whether a particular dispenser is to be used for a solid or for a liquid.

Figure 4:
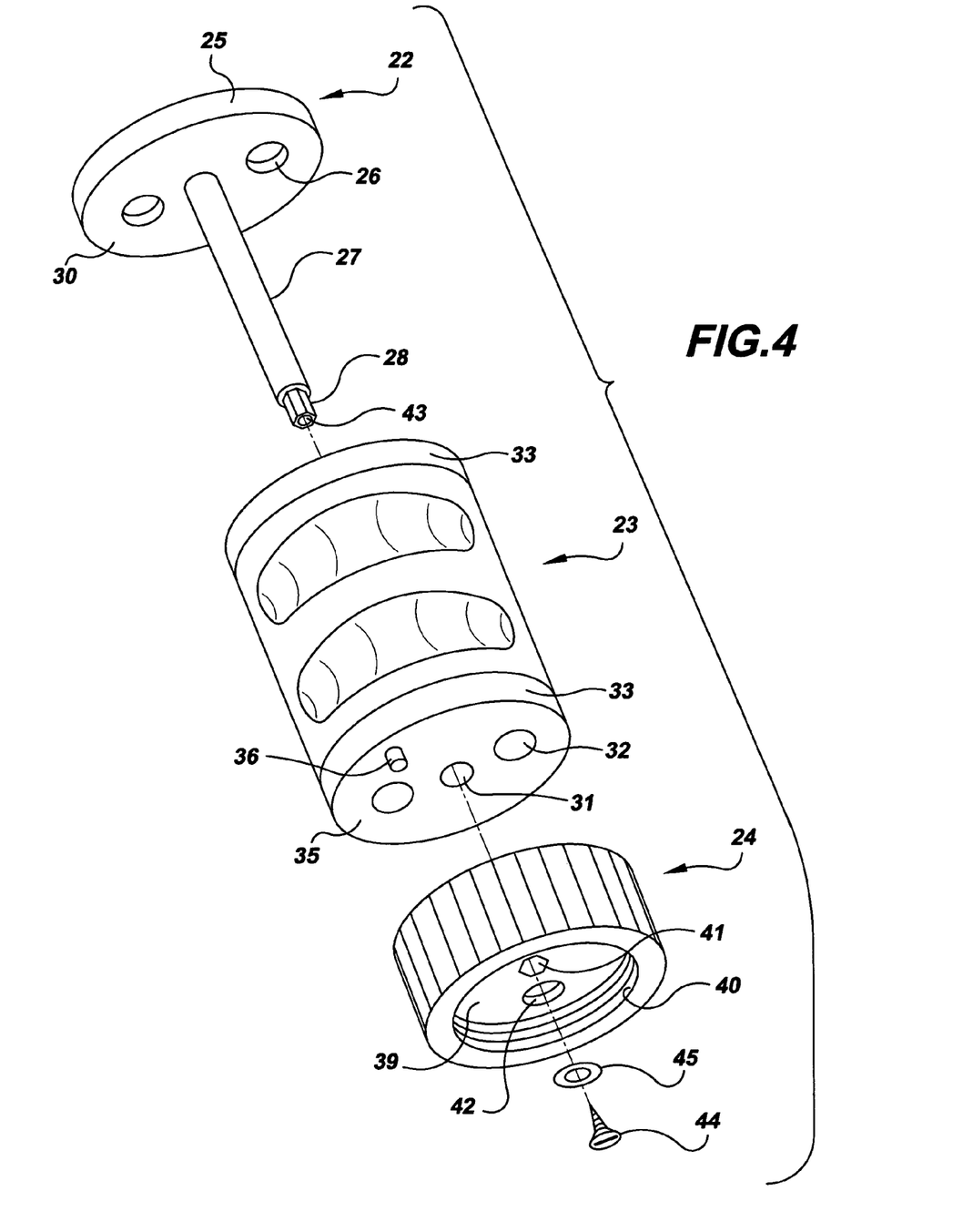
FIG. 4 is a bottom perspective exploded view of the dispenser.
Figure 5:
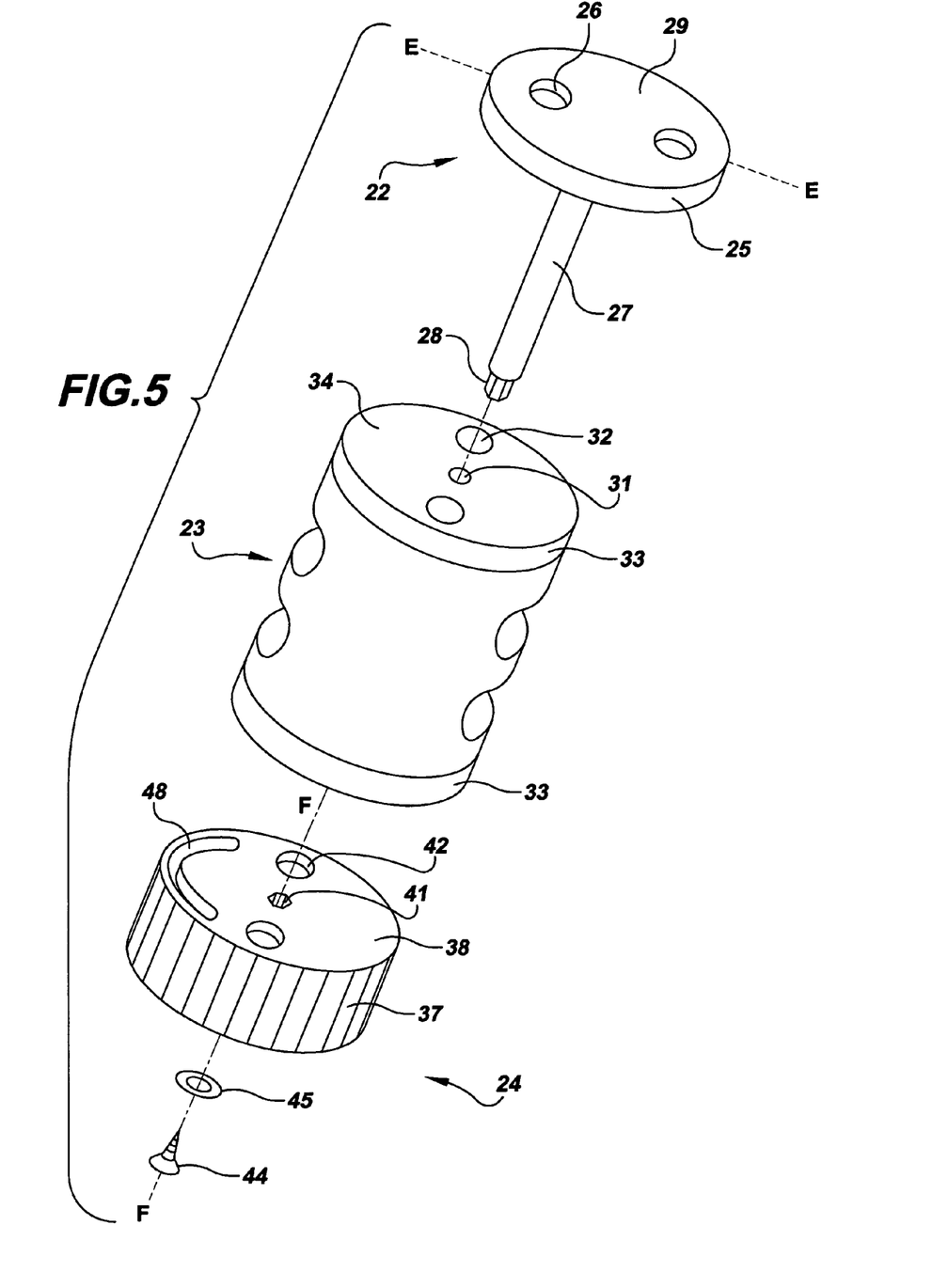
FIG. 5 is a top perspective exploded view of the dispenser.

Referring to FIGS. 4 and 5, the delivery segment 22 may be composed of a disc 25 with two delivery openings 26 and a shaft 27 affixed to the center of the bottom surface 30 of the disc 25. The shaft 27 may be long enough to extend through the barrel 23 and into an opening 41 in upper surface of the connector 24. There may be means at the bottom of the shaft 27 to prohibit rotation once inserted into the opening 41 in the connector 24. One such means may be a polygonally shaped lower end such as a hexagon 28 that is axially aligned with the shaft 27. Other means known in the art may be utilized. The top surface 29 of the disc 25 may be flat or somewhat rounded but the bottom surface 30 of the disc 25 may be substantially flat and finely polished.

The barrel 23 may be substantially cylindrical, but the exterior of the barrel 23 may have straight walls, concave walls, convex walls, or be otherwise shaped. There may be horizontal indentations or vertical ribs within the walls which may function as secure hand holds. The two end portions 33 of the barrel 23 may be round and of the same diameter as the disc 25 of the delivery segment 22 and of the connector 24. There may be a central axial bore 31 through the barrel 23 that may be of slightly larger diameter than the shaft 27 so the shaft 27 may pass through the bore 31 and rotate therewithin with no wobble. The hexagonal end 28 of the shaft 27 may be of the same or lesser diameter as the shaft 27 so as to pass freely through the bore 31. There may also be two axially aligned chambers 32 in the barrel 23 which may extend throughout its full length. These chambers 32 may be situated on opposing sides of the bore 31. The embodiment illustrated and described in FIGS. 4 and 5 may contain a solid material and the two chambers 32 taken together may constitute a single measured volume or dose of the solid material to be dispensed. The chambers 32 may be cylindrical with smooth side walls and disposed such that they may communicate with the delivery openings 26 in the disc 25 when the disc 25 is rotated accordingly.

When the dispenser is to be used for a solid material the chamber or chambers may be straight sided so the material may flow easily into and out of the chambers. When a liquid is to be dispensed, the chamber or chambers may have other configurations as long as the entrance and exit openings in the upper and lower surfaces of the barrel cooperate with the openings in the other two segments when they are properly sequenced. The sequencing of the openings may be critical to the functioning of the dispenser.

Figure 9A:
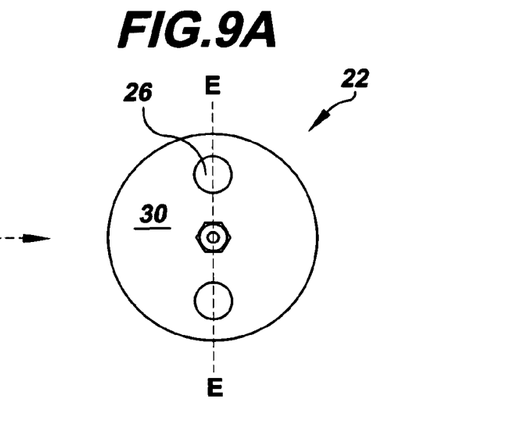
FIGS. 9A, B and C are bottom plan views of the three segments in the dispensing position.
Figure 9B:
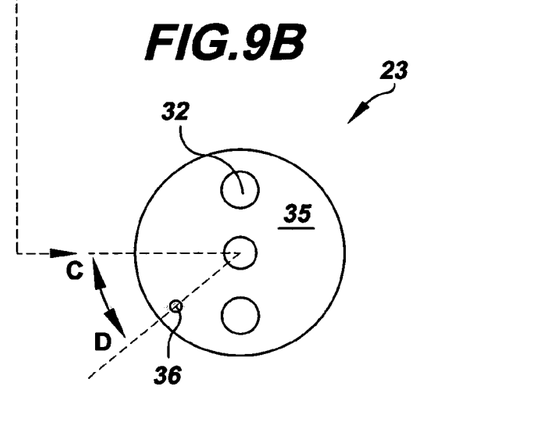

The upper surface 34 of the barrel 23 may be smooth and finely polished so that there may be minimal friction between the lower surface 30 of the disc 25 and the upper surface 34 of the barrel 23 when the barrel 23 is rotated. The lower surface 35 of the barrel 23 may also be smooth and finely polished. There may be a short post 36 extending from the lower surface 35 of the barrel 23. The post 36 may be situated near the circumference of the lower surface 35 and substantially at a 45° arc C-D from the center of one of the chambers 32 (FIGS. 7B and 9B).

Figure 6A:
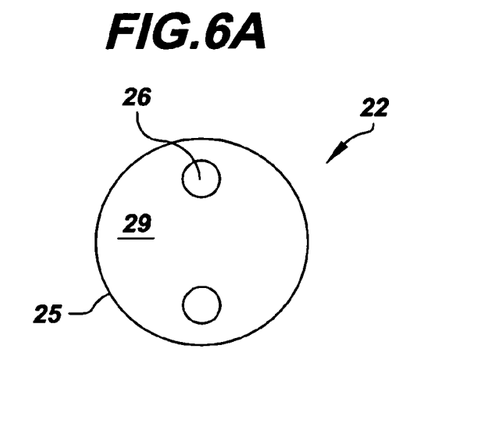
FIGS. 6A, B and C are top plan views of the three segments in the filling position.
Figure 6B:
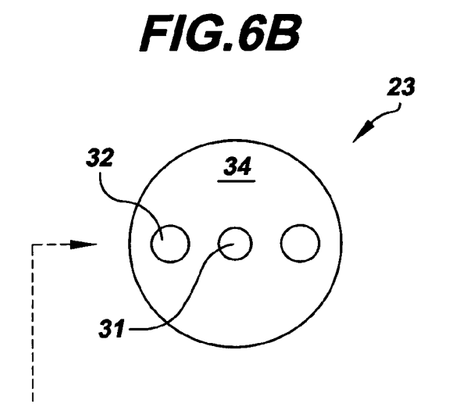
Figure 6C:
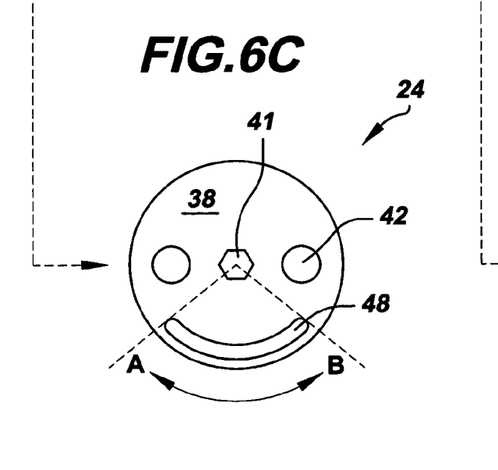

The connector 24 may be cylindrical with a striated or otherwise roughened outer surface 37 to provide a secure hand grip. The outer diameter of the connector 24 may be the same as that of the end portions 33 of the barrel 23 and of the disc 25. There may be a cover member 38 integral with the top edge of the cylinder. The top surface of the cover member 38 may be smooth and polished. The interior 39 of the connector 24 may be open and may have threaded interior walls 40 to cooperate with threading on the neck of a bottle containing the material to be dispensed. There may be three openings through the cover member 38, a central hexagonal opening 41 to receive the hexagonal lower end 28 of the shaft 27 and two entrance openings 42 on opposing sides of the hexagonal opening 39. The entrance openings 42 may be disposed so that they may communicate with the chambers 32 in the barrel 23 when the barrel 23 is rotated accordingly. There may be a curved groove 43 forming a 90° arc A-B on the top surface of the cover member 38 close to the circumference and equidistant between the two entrance openings 42 (FIGS. 6C and 8C). Grooves according to other arc measurements may also be utilized.

The dispenser 20 may be assembled by careful placement of the three segments. The connector 24 may be moved toward the barrel 23 so that the lower surface 35 of the barrel 23 approaches the top surface of the cover member 38. At the same time the post 36 in the lower surface 35 of the barrel 23 may be disposed in the groove 48 in the top surface of the cover member 38. This may permit the lower surface 35 of the barrel 23 to be contiguous with the top surface 38 of the cover member 38. The post 36 and groove 48 may cooperate to limit the rotation of the barrel 23 with respect to the connector 24 and, as noted below, with respect to the delivery segment 22 to 90° or such other arc length as may be selected. The shaft 27 of the delivery segment 22 may be inserted into and extended through the central bore 31 of the barrel 23 until the hexagonal lower end 28 communicates with the hexagonal opening 41 in the cover member 38. Once seated into the hexagonal opening 41, the shaft 27, and with it the delivery segment 22, cannot rotate independently of the connector 24. To maintain the shaft 27 in the opening 41 there may be a threaded bore 43 in the bottom of the shaft into which a headed screw 44 may be inserted. A flexible washer 45 may be interposed between the screw 44 and the bottom of the shaft 27 which may insure a tight connection. Thereafter, the delivery segment 22 and connector 24 may function as a single unit and the top surface of the cover member 38 and the lower surface of the barrel 22 as well as the upper surface of the barrel 23 and the bottom surface of the delivery segment 22 may remain in contiguous alignment. See FIGS. 4 and 5. This connection may be maintained by other means known in the art.

Figure 7A:
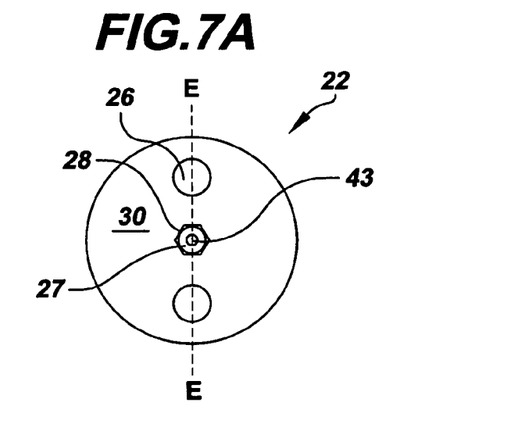
FIGS. 7A, B and C are bottom plan views of the three segments in the filling position.
Figure 7B:
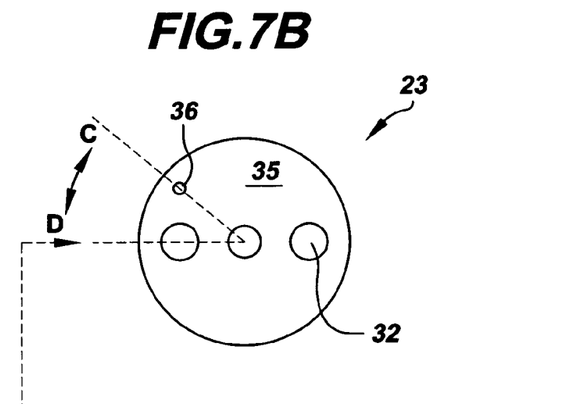
Figure 7C:
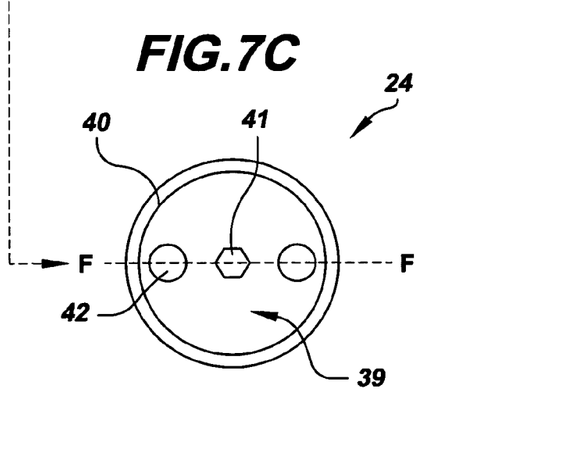

When securing the shaft 27 into the opening 41 the relation between the delivery segment 22 and the connector 24 may be such that an imaginary line E—E between the openings 26 in the delivery segment 22 may be at 90° from an imaginary line F—F between the openings 42 in the connector 24 (FIGS. 5, 7A and C, and 9A and C). This may insure the proper sequencing of the openings when the dispenser 20 is in use. Once assembled, the dispenser 20 may be operated as if it was composed of two rotatable parts, the delivery segment 22 and connector 24 operating as one, and the barrel 23 as the other.

The first segment may be attached to the third segment by other means known in the art as long as the attachment enables the two segments to function as a single unit and be rotatable with respect to the barrel. The attachment means may not interfere with the positioning and functioning of the chamber or chambers within the barrel and the sequencing of the openings in the delivery segment and the connector.

The dispenser 20 may be attached to a storage container such as a bottle 21 by removing the usual screw cap (not shown) from the bottle 21 and replacing it with the dispenser 20 which may be secured to the bottle 21 by the cooperation between the threaded inside walls 40 of the connector 24 and the threading on the neck of the bottle 21. Once in place, the dispenser 20 may remain attached to the container as long as there is material within the container to be dispensed. The bottle 21 and attached dispenser 20 may be stored in the upright position.

Figure 3:
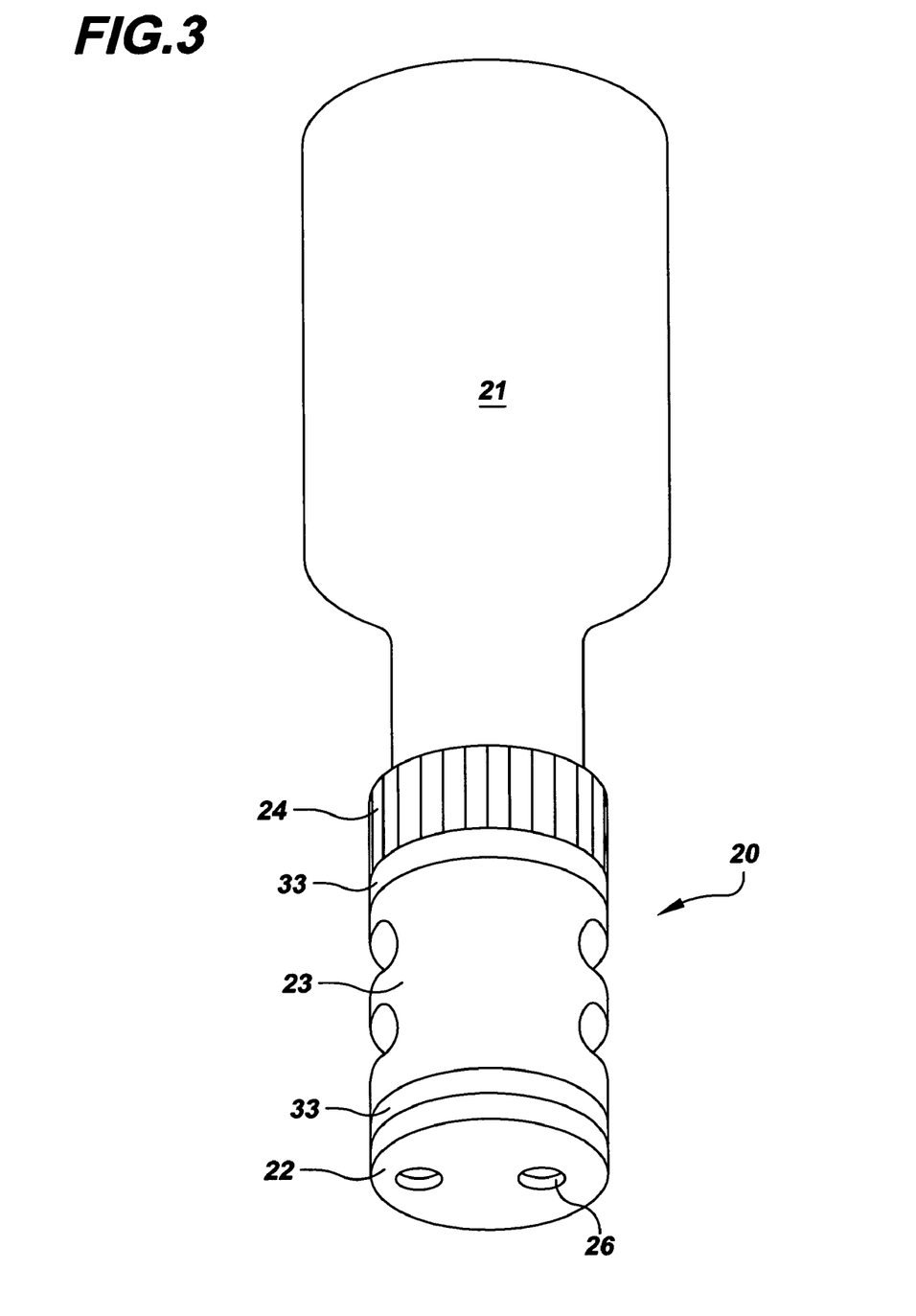
FIG. 3 is a top perspective view of the dispenser attached to a bottle in the inverted orientation and ready for use.

In use, the combination may be inverted as seen in FIG. 3. The user may hold the barrel 23 in one hand and the connector 24 or the bottle 21 in the other hand and rotate the barrel 23 or the bottle 21 until the chambers 32 are in communication with the openings 42 in connector 24. (See FIGS. 5, 6B and 6C; 7B and 7C) At this point the openings 26 in the delivery segment 22 may be 90° from the chambers 32 and the chambers 32 may be sealed at their upper ends by the solid portion of the disc 25. This orientation may permit the material in the bottle 21 to pass downward by gravity to fill the chambers 32 and go no farther. (See FIGS. 6A and 7A) The post 36 and groove 48 may act together as a restriction and stop means, limiting the rotation of the barrel 23 to 90° and creating a first position for filling the chambers 32 with the post 36 at one end of the groove 48. Other stop means known in the art may be used as well as other arc measurements. To aid in the filling operation, the barrel 23 may be made of a transparent or translucent material so the user may see when the chamber or chambers are filled.

Figure 8A:
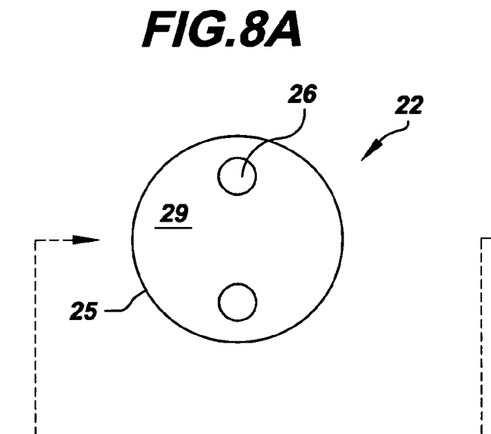
FIGS. 8A, B and C are top plan views of the three segments in the dispensing position.
Figure 8B:
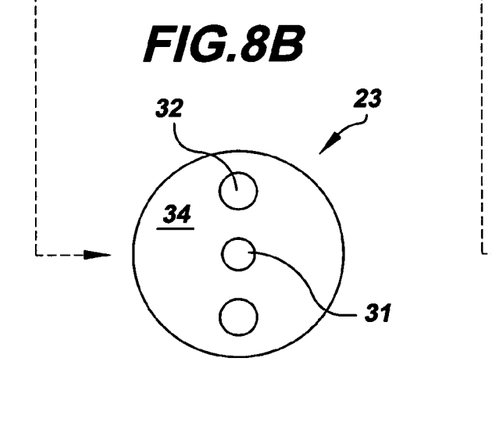
Figure 8C:
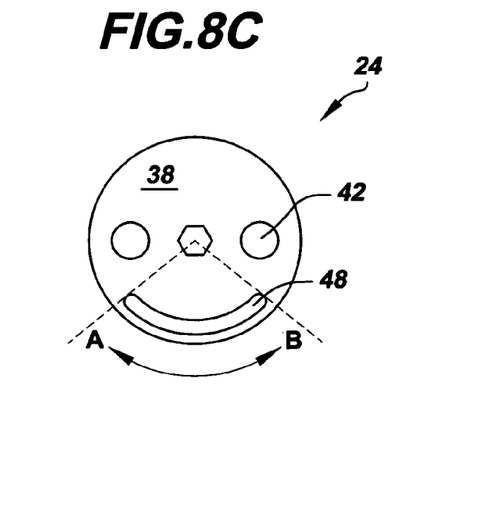
Figure 9C:
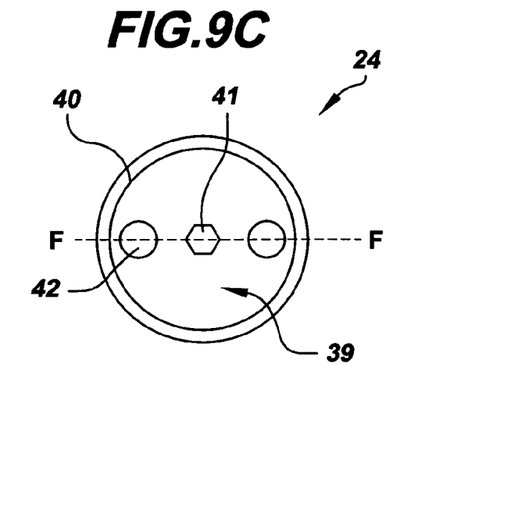

Once the chambers 32 are filled, the user may rotate the barrel 23 in the opposite direction to a second position where the openings 26 in the disc 25 are aligned with the chambers 32 (FIGS. 4, 8A and 8B; 9A and 9B). The material in the chambers 32 may now move downward by gravity through the openings 26 in the disc 25 and out of the dispenser 20. At this time the openings 42 in the connector 24 may be 90° from the chambers 32 closing the other ends of the chambers 32 so that no material can pass from the bottle 21 into the dispenser 20. FIGS. 4, 8C and 9C are illustrative of the second or dispensing position. There may be a marking or markings (not illustrated) on the dispenser 20 to indicate the filling position and the dispensing position and also a position half way between the two. The half way position is indicative of the orientation whereby both the tops and bottoms of the chamber 32 are closed off by solid portions of the disc 25 and the cover member 38. The marking or markings may be in the form of protrusions or indentations on the barrel 23 and disc 25 of the delivery segment 22 as an assist for the visually impaired. The fact that the stop means limits the rotation of the barrel may also aid the visually impaired in knowing when each position has been reached and a marking of the half way position may indicate that the chambers are closed at both ends.

For storage the barrel 23 may be rotated to the half way position. It may be important to have an orientation where the chambers be closed at both the top and the bottom. This may require that the dispenser be constructed with the proper sequencing as a major concern. Sequencing that enables the chambers to be closed at top and bottom may require that the space between any two openings in the disc and in the connector be at least twice the width of an opening as measured on the arc of a circle. When one or more than two chambers are present the sequencing may differ from that described above, but may require careful configuring to achieve proper sealing of the chambers. The bottle 21 may be stored with the dispenser 20 attached since in both the dispensing position and the filling position the bottle 21 may be closed to the atmosphere and in the half way position both the bottle 21 and the chambers 32 may be closed to the atmosphere.

It is critical that there be no overlap between the chambers 32 and the openings 26 in the delivery segment 22 during the filling operation and no overlap between the chambers 32 and the openings 42 in the connector 24 during the dispensing operation. This may not be left to chance. Proper sequencing, as described above, may insure against any such overlap. It is for this reason that the dimensions of the chambers, the size of the chambers and the number of chambers in a particular dispenser must be carefully calculated, as well as the distance between the openings to the chambers and the openings in the disc and in the connector.

The embodiment of the dispenser illustrated and described in detail above may be specifically designed to dispense a quantitative dose of a powdered or granulated medicament or other freely flowing solid. To make it easier for the user, the dispenser may remain in place attached to the supply container until the container is empty. For this reason the dispenser may be made as small as possible, in both height and width. As in the example described above, two chambers may be provided to contain a single dose. The two chambers may be straight sided and axially oriented so the barrel may be kept substantially short. A dispenser for use with large doses of a material such as for a powdered detergent may be considerably larger and may have one large chamber, or two or more chambers. Though both the top and bottom openings of the chambers may be axially aligned, the chambers may be variously shaped. When more than one chamber is present, each chamber may contain a separate dose, each being dispensed independently of the other or the chambers collectively may contain a single dose. Regardless of the number of chambers, careful attention may be paid to the design to insure that there may be no overlap between the chambers and the openings in the disc during the filling operation and between the chambers and the openings in the connector during the dispensing operation. The half way position may be particularly important when a material is susceptible to moisture and may clump easily in the presence of moisture requiring that the chambers be completely closed to the atmosphere when not being filled or emptied. Therefore there must be sufficient solid portions between the openings of the disc and connector to insure complete closure.

Figures 14, 15:
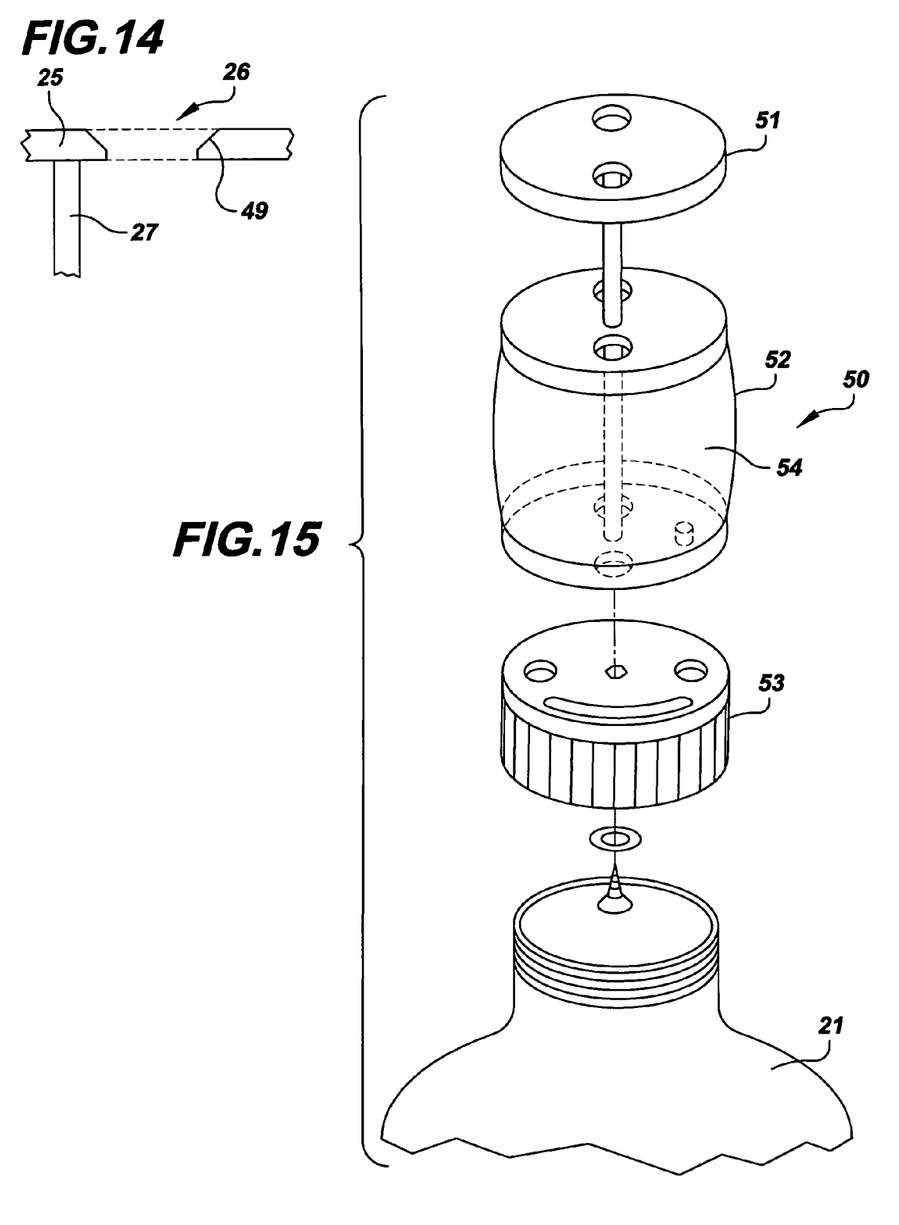
FIG. 14 is partial sectional view of a disc of a delivery segment.
FIG. 15 is an exploded view of a dispenser for use with liquids.

When a dispenser is to be used for solid materials, the walls 49 of the openings 26 in the disc 25 of the delivery segment 22 may be slanted outwardly, as seen in FIG. 14, to provide a funneling effect for the exiting material. This may assist in a rapid flow rate and may also prevent any clogging or clumping of the solid material as it exits the chambers 32.

Figure 10:
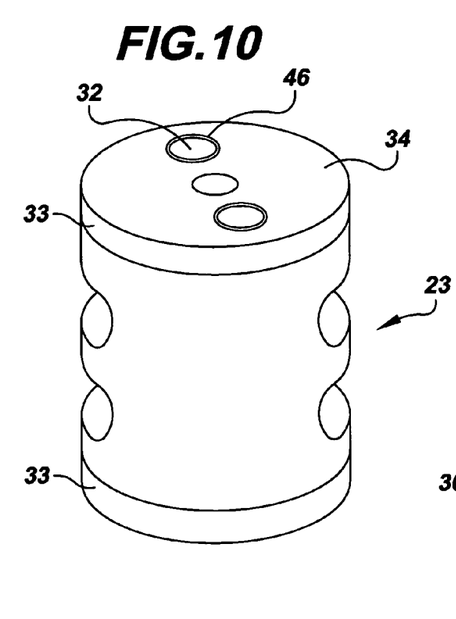
FIG. 10 is a top perspective view of the barrel designed for solids showing the rims.
Figure 11:
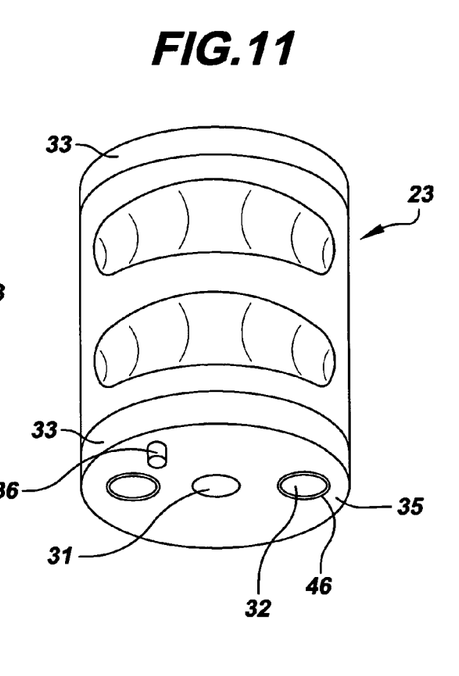
FIG. 11 is a bottom perspective view of the barrel designed for solids showing the rims.
Figure 12:
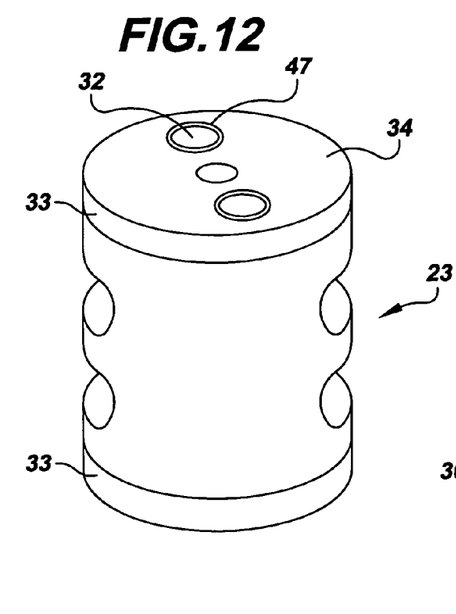
FIG. 12 is a top perspective view of the barrel designed for liquids showing the depressions.
Figure 13:
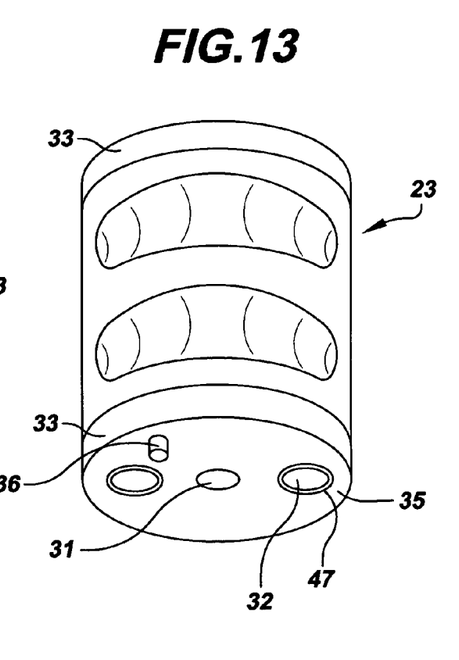
FIG. 13 is a bottom perspective view of the barrel designed for liquids showing the depressions.

The barrel may be manufactured with certain modifications depending upon whether it is to measure and dispense a liquid or a solid. When a dispenser is to be used for a solid there may be small ridges or washer-like rims 46 on the polished upper surface 34 of the barrel 23 surrounding the chambers 32 and on the polished lower surface 35 of the barrel 23 surrounding the chambers 32. These rims 46 may insure a seal between the chamber and the closing surfaces of the disc 25 and the cover member 38 and may prevent the solid material from finding its way between the polished surfaces. See FIGS. 10 and 11. A dispenser for liquids may have depressions 47 on the polished upper surface 34 of the barrel 23 surrounding the chambers 32 and on the polished lower surface 35 of the barrel 23 surrounding the chambers 32. These depressions, as seen in FIGS. 12 and 13, may hold O-rings (not illustrated) or other sealing means which may act as seals to prevent the liquid from seeping out of the chambers and finding its way between the polished surfaces. The depressions 47 may be sufficiently deep so that the O-rings or other sealing means extend just far enough above the surfaces 34 and 35 of the barrel 23 to provide a barrier to seepage, but not to interfere with free rotation of the barrel 23.

A dispenser 50 designed specifically for use with liquids may also be composed of three segments, a delivery segment 51, a barrel 52, and a connector 53. The delivery segment 51 and the connector 53 may be substantially the same as described above. The barrel 52 may contain one or more chambers, or the entire interior of the barrel 52 may constitute the chamber 54 to contain a measured quantity of liquid. An example may be seen in FIG. 15. When one chamber is present it may be advantageous to have two openings in the top and bottom of the barrel 52 and in the delivery segment 51 and connector 53. The two openings may provide a means to prevent the vacuum effect that often acts as a hindrance to the free flow of a liquid from a closed container. The use of two openings may require the same sequencing of the openings in the delivery segment 51 and the connector 53 as previously described to insure that one end of the barrel 52 is sealed when the other end is opened, either for filling or dispensing the liquid.

Often when a quantitative dose of a medicament is required there may also be a requirement that the medicament be mixed with a specific volume of a liquid such as water before ingestion. The liquid may be measured using a conventional measuring cup or spoon, or a liquid container may be provided with the medicament. Most such measuring devices may be inaccurate and may also be difficult for some people to use, especially those with the common physical disabilities of the elderly such as arthritis or those with a visual impairment. A measuring container for the liquid may be provided with the dispenser 20. Such a container 55 may be a simple cup that may be calibrated to contain and deliver a specific quantity of the liquid, or a modified container may be supplied. The modified container 55 may have a single opening 57 in the side wall 56 at a calibrated level so that when the container is filled up to the level of the opening 57 it may contain and be capable of delivering the volume of liquid required.

Figure 16:
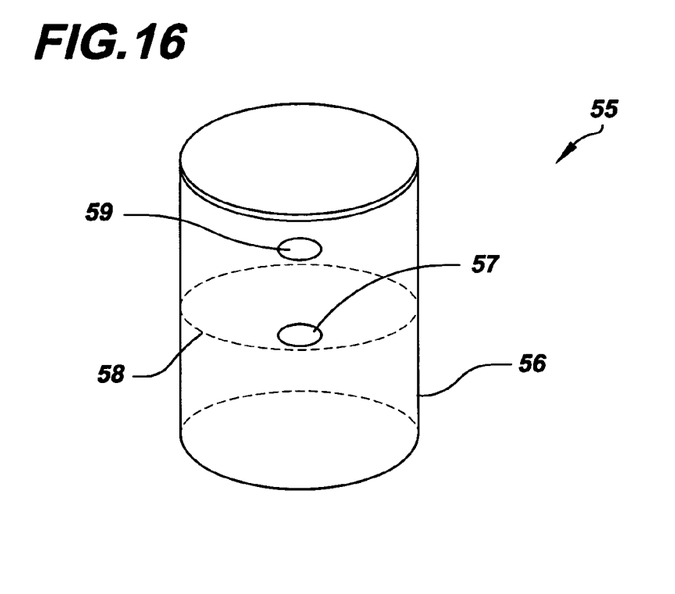
FIG. 16 is perspective view of a water container.
Figure 17:
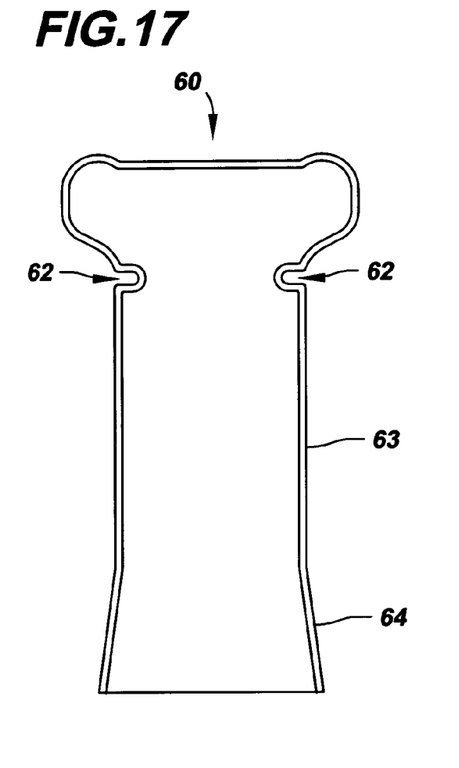
FIG. 17 is a sectional view of the inverted quantitative measuring container.

When the liquid is water the container 55 may be filled by holding it over the sink and introducing water directly from the faucet. The water may fill the container 55 until it reaches the level of the opening 57 at which point water will run out of the container through the opening 57. The level of the water in the container 55 cannot rise above the level of the opening 57 as long as the opening is not obstructed, so no more than the desired quantity of water may remain in the container 55. See FIG. 16. If twice that quantity is needed the user can fill the container twice. Alternatively, the total volume of the container 55 may be twice the desired amount, or a second opening 59 may be present above the first at such a level that when the container 55 is filled to the second opening the container may hold twice the quantity of water. To utilize the second opening the user need only place a finger over the first opening so the water cannot exit at that level and the container may be filled to the level of the second opening. More than two openings may be provided for various quantities of water. For ease of use, the openings may be one above the other.

Figure 20:
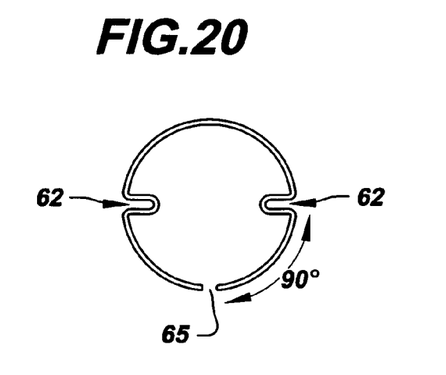
FIG. 20 is a sectional view through line 20—20 of FIG. 19.
Figure 21:
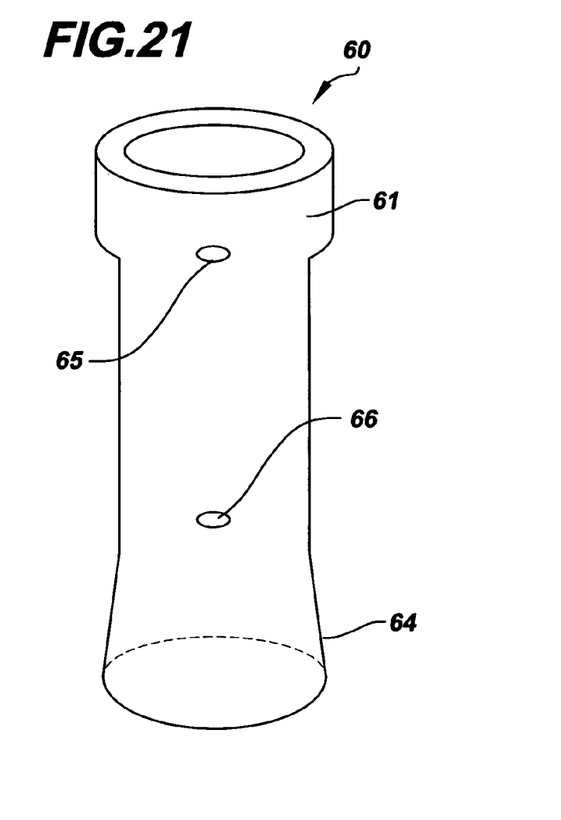
FIG. 21 is a front perspective view of the inverted container of FIG. 19.
Figure 22:
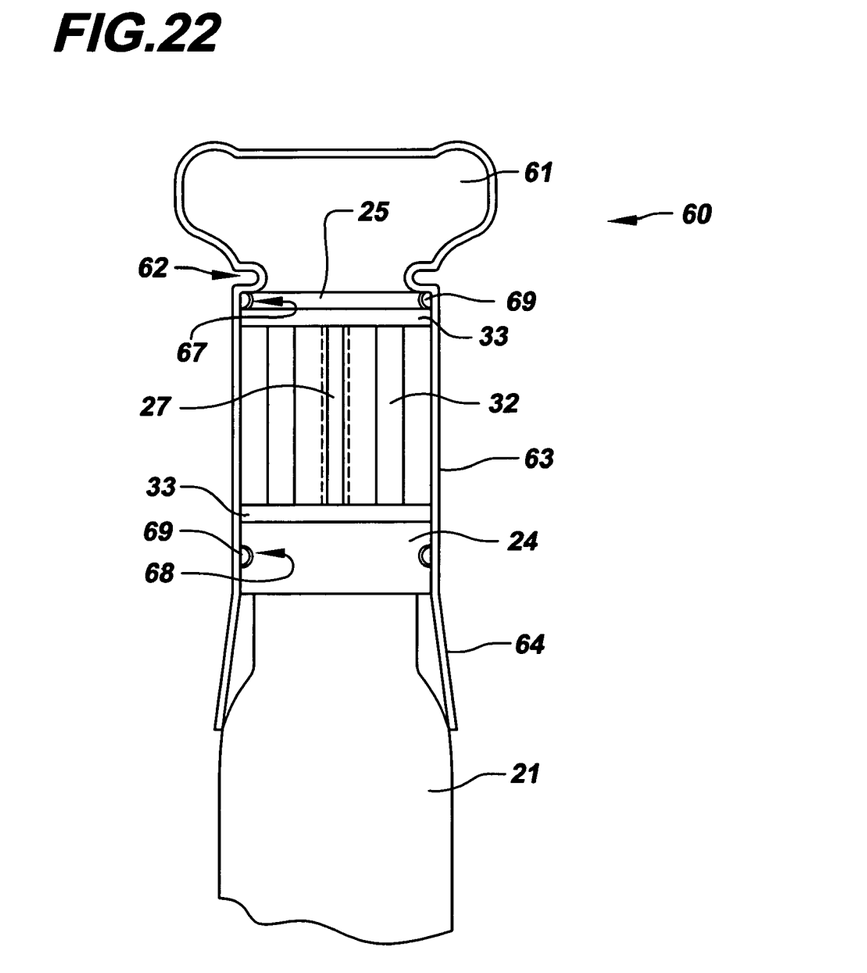
FIG. 22 is a sectional view of the container, the dispenser and the bottle.

A companion for the dispenser 20 may be a special quantitative container 60 designed to fit securely over the dispenser 20 for storage. The container 60 may be substantially cylindrical with a widened bottom portion 61. There may be two indentations 62 on opposing sides of the cylinder just above the bottom portion 61. These indentations 62 may function as stops when the container 60 is inverted and placed over the dispenser 20. When connected to the bottle 21, the container 60 may be seated by pressing downward on the dispenser 20 as far as the stops or depressions 62 may permit and the stops may prevent the container from being forced downward onto the bottle 21 and becoming stuck thereon. The uppermost portion of the walls 63 of the cylinder may slant outwardly forming a shoulder 64 which enables the container 60 to be superimposed on the dispenser 20 without it being stopped by the walls of the bottle 21 as seen in FIG. 22. There may be two openings in the cylinder, one above the other, a first opening 65 at substantially the level of the indentations 62 and disposed at 90° therefrom (see FIGS. 19, 20 and 21), and a second opening 66 just below the shoulder 64. The use of two openings may permit the container 60 to be used to dispense one, two or three times a given quantity of water. Permitting the water to fill to the first opening 65 provides one measure of water. By holding a finger over the first opening 65 the container 60 may be filled until the water reaches and spills out of the second opening 66 providing two measures of water. The user may place another finger over the second opening 66 and fill the container to the top at which point three measures of water may be provided. The design and calibration of this type of container may depend upon the type of medicament and the quantity of water needed for the particular dosing requirements.

The locations of the openings may provide equal volumes of water in each measure, or they may be positioned to meet other requirements. The widened bottom portion 61 of the container 60 described above may enable the bottom portion to contain the same amount of water as the central and upper portions. The particular design of the container 60 may provide three equal volumes of water while keeping the overall height of the container to a minimum. This particular design may represent just one of many possible variations. The openings through which the water seeks its level may be round, but more accurate dispensing of quantitative amounts of water may be obtained when the openings are oval with a horizontal axis. The oval opening may tend to break the meniscus more readily so the surface tension of the water does not prevent the maximum outflow to the level of the opening. The use of the water leveling openings may enable those with visual impairments to be able to measure quantitative amounts of water with an accuracy they may not have previously attained.

Figure 18:
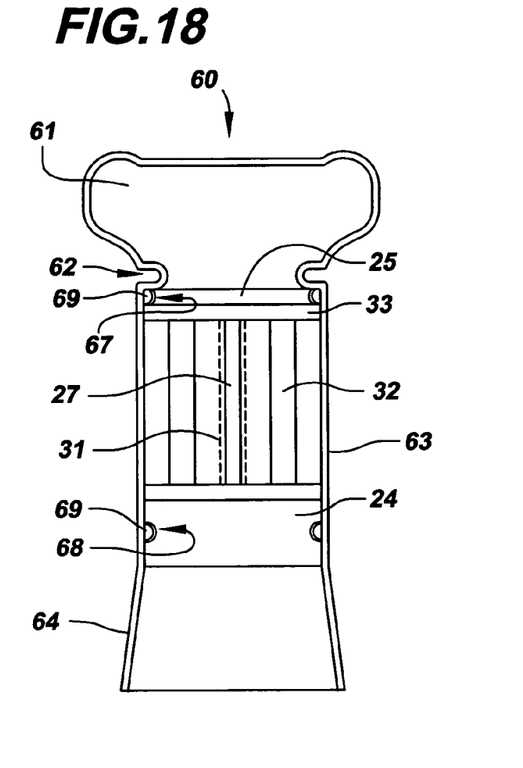
FIG. 18 is a sectional view of the inverted quantitative measuring container and the dispenser.
Figure 19:
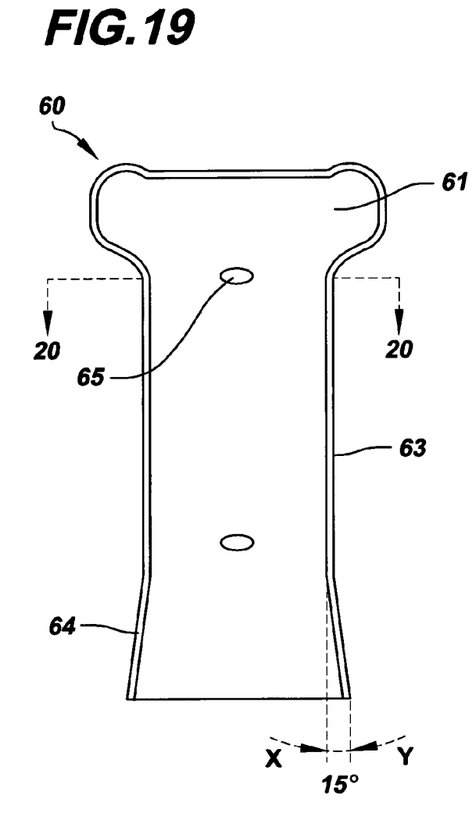
FIG. 19 is a sectional view of the inverted quantitative measuring container turned 90° from the view of FIG. 17.

The quantitative container 60 may be seen in FIGS. 17, 18, 19 and 21 inverted as it may be placed atop the dispenser 20 (FIG. 18). The widening of the walls 63 forming the shoulder 64 may enable the container 60 to be seated over the dispenser 20 when it is affixed to the bottle 21 of the medicament. The widened walls of the container 60 may extend over the sides of the bottle. The angle of widening X-Y may depend on the shape of the bottle with which it is to be used. One such bottle may require an angle of 15° (FIG. 19).

The construction of the dispenser 20 of the instant invention may maintain the interior of the supply bottle 21 closed to the atmosphere so that no air or moisture can enter the bottle 21. The sequencing of the openings may also establish that either the connector openings 42 or the delivery openings 26 are closed at any given time, or that the chambers are closed when the barrel is in the half way position. In all of those circumstances the bottle 21 may be closed to the atmosphere. However, when the container 60 is used to measure water and is thereafter inverted and superimposed on the dispenser 20, residual moisture present in the container 60 may come in close proximity to the dispenser and seep in between the segments. This may be very problematic if the freely flowing material is very moisture sensitive. To minimize any contact between residual water and the dispenser, the exterior of the dispenser 20 may have an annular groove 67 about the outer surface of the disc 25 and another annular groove 68 about the outer surface of the connector 24. O-rings 69 or other sealing means may be placed into each of these grooves so that when the measuring container 60 is placed over the dispenser 20 a seal may be formed at both levels such that no moisture from the container 60 can reach the interior of the dispenser 20. The seals also close off the mid portion of the dispenser from the atmosphere. See FIGS. 18 and 22. Any residual moisture remaining in the bottom portion 61 of the container 60 may be prevented from finding its way down the sides of the container by the seal 69. Since the opening 65 in the side of the bottom portion 61 may be above the seal (when the container 60 is inverted over the dispenser 20) any moisture trapped there may evaporate. The other opening 66 may be below the seal when inverted so that the dispenser 20 is completely sealed off from the atmosphere, as noted. The seals 69 may also prevent the container 60 from being separated from the dispenser 20 and the bottle 21 during storage and transport.

Both the dispenser 20 and the measuring container 60 may be made of a plastic or other polymeric material. The barrel may be transparent or translucent. The particular material chosen may be determined by the specific characteristics of the medicament or other substance to be dispensed and the targeted users. The size of the device may also be determined by the type of material and the dose itself. The particular embodiment of the dispenser 20 described and illustrated herein may be designed to deliver a dose of 2 cc of a powder. Therefore each chamber may have a volume of 1 cc since the contents of both chambers constitute a single dose. The height of the device may be 6.09 cm and the exterior diameter may be 3.8 cm. The companion water container may have a height of 12.4 cm, the exterior diameter of the wider bottom portion 6.50 cm, the exterior diameter of the main cylinder 4.1 cm and the exterior diameter of the widened shoulder end 5.0 cm. Each section of the container may be structured to deliver 60 cc of liquid. Therefore, when the container is filled to the first opening 65, 60 cc may be delivered, when filled to the second opening 66 the container may deliver 120 cc of water, and when filled to the top the container may deliver 180 cc of water.

The precision and tolerances of the dispenser may depend on the particular substance to be dispensed and the quantity of the substance to be dispensed. These considerations may also dictate the extent of the smoothness or polish of the contiguous surfaces of the barrel, the disc and the connector. Whether a dispenser is to be used for a liquid or a solid also may determine the particulars of the design and the type of plastic used in its manufacture. Additionally, a spring loaded return may be incorporated within the dispenser so the unit returns to a closed position with respect to the barrel when not hand controlled.

While several embodiments of the present invention have been illustrated and described in detail, it is to be understood that this invention is not limited thereto and may be otherwise practiced within the scope of the following claims.

I claim:

1. A dispenser for containing and dispensing a measured quantity of a freely flowing material, said dispenser comprising:
   a first segment having a disc with an upper surface and a lower surface, a shaft having a first end which is fixedly attached at the center of the lower surface of the disc and a second end, and two apertures opposingly disposed in the disc;
   a second segment substantially in the form of a barrel and having an upper surface, a lower surface, a central bore and two axial chambers situated on either side of the bore and extending through the barrel;
   a third segment having a cylindrical wall with an inner surface and an outer surface, a cover member integral with the upper edge of the wall and having an upper surface and a lower surface and two apertures opposingly disposed in the cover member; and
   means to permanently affix the second end of the shaft to the center of the upper surface of the cover member;
   whereby when the second end of the shaft is passed through the central bore and the disc is rotated until an imaginary line through the apertures in the disc is at 90° to an imaginary line through the apertures in the cover member and the second end of the shaft is permanently affixed to the upper surface of the cover member, the lower surface of the disc is substantially contiguous with the upper surface of the barrel and the lower surface of the barrel is substantially contiguous with the upper surface of the cover member, the first segment and the third segment can function as a single unit, and when the barrel is rotated with respect to the unit so that the apertures in the cover member communicate with the bottoms of the chambers and the disc closes the tops of the chambers the dispenser can be filled with the freely flowing material and when the barrel is rotated with respect to the unit so that the apertures in the disc communicate with the tops of the chambers and the cover member closes the bottoms of the chambers the dispenser can dispense the freely flowing material.

2. A dispenser as in claim 1 wherein the chambers are constructed and calibrated to contain and deliver a specific quantity of the freely flowing material.

3. A dispenser as in claim 1 wherein the combined volume of the two chambers constitutes a single dose of the freely flowing material.

4. A dispenser as in claim 1 further comprising means to reversibly attach the dispenser to a bottle containing the freely flowing material whereby the freely flowing material can be dispensed directly from the bottle into the chambers of the dispenser and thereafter out of the dispenser when the bottle and dispenser are inverted.

5. A dispenser as in claim 1 further comprising stop means such that the barrel can only be rotated through a predetermined arc with respect to the unit.

6. A dispenser as in claim 5 wherein the stop means comprises:
   a groove situated near the periphery of the upper surface of the cover member and equidistant from the apertures, said groove being in the form of a predetermined arc; and
   a post affixed to the lower surface of the barrel at a point near the periphery of the lower surface and substantially one half the extent of the predetermined arc from the center of one of the chambers;
   whereby the post is aligned within the groove and restricts the rotation of the barrel to the predetermined arc.

7. A dispenser as in claim 6 wherein the predetermined arc is 90°.

8. A dispenser as in claim 1 wherein the exterior of the barrel has an upper end portion, a lower end portion and a central holding portion.

9. A dispenser as in claim 8 wherein the upper and lower end portions of the barrel, the first segment and the third segment all have the same exterior diameters.

10. A dispenser as in claim 8 wherein the central holding portion is configured to provide a hand grip.

11. A dispenser as in claim 1 wherein the means to permanently affix the second end of the shaft to the center of the upper surface of the cover member comprises:
    a shaft having the second end in the configuration of a polygon when viewed in cross section;
    a polygonal opening in the center of the cover member; and
    means to permanently retain the second end of the shaft in the hole in the cover member;
    whereby when the shaft is passed through the central bore in the barrel and the disc is rotated until an imaginary line through the apertures in the disc is at 90° to an imaginary line through the apertures in the cover member and the second end of the shaft is in communication with the opening in the cover member and is permanently retained therein, the first segment and the third segment can function as a single unit.

12. A dispenser as in claim 1 wherein the outer surface of the cylindrical wall is textured to provide a gripping surface.

13. A dispenser as in claim 1 further comprising rims about the chambers on the upper and lower surfaces of the barrel, said rims to prevent the freely flowing material to enter the space between the barrel and the disc and between the barrel and the cover member when the freely flowing material is a solid.

14. A dispenser as in claim 1 further comprising depressions about the chambers on the upper and lower surfaces of the barrel and sealing means for placement in said depressions, said sealing means to prevent the freely flowing material to enter the space between the barrel and the disc and between the barrel and the cover member when the freely flowing material is a liquid.

15. A dispenser as in claim 1 wherein the walls of the apertures in the disc are slanted outwardly to assist the outward flow of the freely flowing material from the dispenser.

16. A dispenser as in claim 1 wherein the barrel is transparent so that the user can see when the chambers are filled.

17. A dispenser for containing and dispensing measured quantities of a freely flowing material, said dispenser comprising:
    a first segment substantially in the form of a disc with an upper surface, a lower surface, and at least one aperture therethrough;
    a second segment substantially in the form of a barrel and having an upper surface, a lower surface, and at least one chamber extending through the barrel;
    a third segment having a cylindrical wall with an inner surface and an outer surface, a cover member integral with the upper edge of the wall and having an upper surface and a lower surface and at least one aperture disposed in the cover member; and
    means to permanently attach the first segment to the third segment such that the two segments function as a single unit and the at least one aperture in the disc is not aligned with the at least one aperture in the cover member, said unit being rotatable with respect to the barrel;

whereby when the first segment is attached to the third segment, the lower surface of the disc is substantially contiguous with the upper surface of the barrel and the lower surface of the barrel is substantially contiguous with the upper surface of the cover member, and when the barrel is rotated with respect to the unit so that the at least one aperture in the cover member communicates with the bottom of the at least one chamber and the disc completely closes the top of the at least one chamber the dispenser can be filled with the freely flowing material and when the barrel is rotated so that the at least one aperture in the disc communicates with the top of the at least one chamber and the cover member completely closes the bottom of the at least one chamber the dispenser can dispense the freely flowing material.

18. A dispenser as in claim 17 further comprising means to restrict the rotation of the barrel with respect to the unit to a predetermined arc.

19. A dispenser as in claim 17 further comprising means to reversibly attach the dispenser to a container of the freely flowing material whereby the freely flowing material can be dispensed directly from the container into the chambers of the dispenser and thereafter out of the dispenser when the container and the dispenser are inverted.

20. A dispenser for containing and dispensing measured quantities of a freely flowing material in combination with a container for containing and dispensing measured quantities of a liquid:

said dispenser comprising:
　a first segment substantially in the form of a disc with an upper surface, a lower surface, and at least one aperture therethrough;
　a second segment substantially in the form of a barrel and having an upper surface, a lower surface, and at least one chamber extending through the barrel;
　a third segment having a cylindrical wall with an inner surface and an outer surface, a cover member integral with the upper edge of the wall and having an upper surface and a lower surface and at least one aperture disposed in the cover member; and
　means to permanently attach the first segment to the third segment such that the two segments function as a single unit and the at least one aperture in the disc is not aligned with the at least one aperture in the cover member, said unit being rotatable with respect to the barrel;

and said container comprising:
　a cylinder having a base and being open at the top;
　at least one opening in the wall of the cylinder at a substantial distance from the base such that the cylinder can contain a measured quantity of a liquid when filled to the level of the at least one opening;
and wherein said container is superimposable on the dispenser for storage.

21. A combination as in claim 20 further comprising a bottle containing the freely flowing material and means to reversibly attach the dispenser to the bottle whereby the freely flowing material can be dispensed directly from the bottle into the chambers of the dispenser and thereafter out of the dispenser when the container and the dispenser are inverted.

22. A combination as in claim 21 wherein the container is configured to be superimposable on the dispenser with the bottle attached thereto.

23. A combination as in claim 22 wherein the dispenser further comprises sealing means to prevent the liquid from reaching the dispenser when the container is superimposed thereon.

24. A container for holding and dispensing a measured quantity of a liquid, said container comprising:
　a cylinder having a base and being open at the top;
　at least one opening in the wall of the cylinder at a predetermined calibrated distance from the base such that the cylinder can hold the measured quantity of the liquid when filled to the level of the opening;
whereby the container can be filled so that it holds and can dispense the measured quantity of liquid by pouring the liquid into the container until the liquid reaches the opening through which excess liquid flows leaving the measured quantity of liquid in the container to be thereafter dispensed.

25. A container for holding and dispensing measured quantities of a liquid, said container comprising:
　a cylinder having a base and being open at the top;
　a first opening in the wall of the cylinder at a predetermined calibrated distance from the base such that the cylinder can hold a first measured quantity of the liquid when filled to the level of the first opening;
　at least one second opening in the wall of the cylinder directly above said first opening at least one second predetermined calibrated distance from the base such that the cylinder can hold at least one second measured quantity of the liquid when filled to the level of the at least one second opening;
whereby the container can be filled so that it holds and can dispense the first measured quantity of liquid by pouring the liquid into the container until the liquid reaches the first opening through which excess liquid flows leaving the first measured quantity of liquid in the container to be thereafter dispensed, or the first opening can be closed by placing a finger thereupon and the container filled until the liquid reaches and flows out of the at least one second opening leaving the at least one second measured quantity of liquid in the container to be thereafter dispensed.

26. A container as in claim 25 wherein the openings in the wall of the cylinder are oval in shape and lie in a horizontal axis.

* * * * *